United States Patent [19]

Aubry et al.

[11] Patent Number: 4,629,213
[45] Date of Patent: Dec. 16, 1986

[54] SUSPENSION SYSTEM FOR A SET OF VEHICLE WHEELS WITH RIGID AXLE

[75] Inventors: Jacques Aubry, Cabries; Michel Bonfils, St. Cannat; Jean-Paul Merlet, Mimet, all of France

[73] Assignee: Societe Nationale Industrielle Aerospatiale, Paris, France

[21] Appl. No.: 717,152

[22] Filed: Mar. 28, 1985

[30] Foreign Application Priority Data

Apr. 3, 1984 [FR] France .................. 84 05245

[51] Int. Cl.$^4$ .................. B60G 9/04; B60G 11/44; B62D 53/02
[52] U.S. Cl. ................................. 280/718; 180/731
[58] Field of Search ............ 280/715, 718; 180/73.1, 180/71

[56] References Cited

U.S. PATENT DOCUMENTS 1,453,345 5/1923 Ferguson .................. 180/73.1

Primary Examiner—John J. Love
Assistant Examiner—Kenneth R. Rice
Attorney, Agent, or Firm—Fisher, Christen & Sabol

[57] ABSTRACT

The invention relates to a suspension system for a set of vehicle wheels with rigid axle, said suspension system comprising, on the one hand, a longitudinal torsion tube articulated at one of its ends on the chassis of the vehicle so as to be able to pivot about a transverse horizontal axis without possibility of rotating about its longitudinal axis and fast at its other end with said rigid axle and, on the other hand, two longitudinal elastic blades which are disposed laterally each on one side of said torsion tube and of which each is fixed at one of its ends to said axle, is pivoted in its intermediate part on said chassis about a transverse axis and is in abutment at its other end against said chassis. The invention is more particularly applicable to a suspension for road tractor.

4 Claims, 5 Drawing Figures

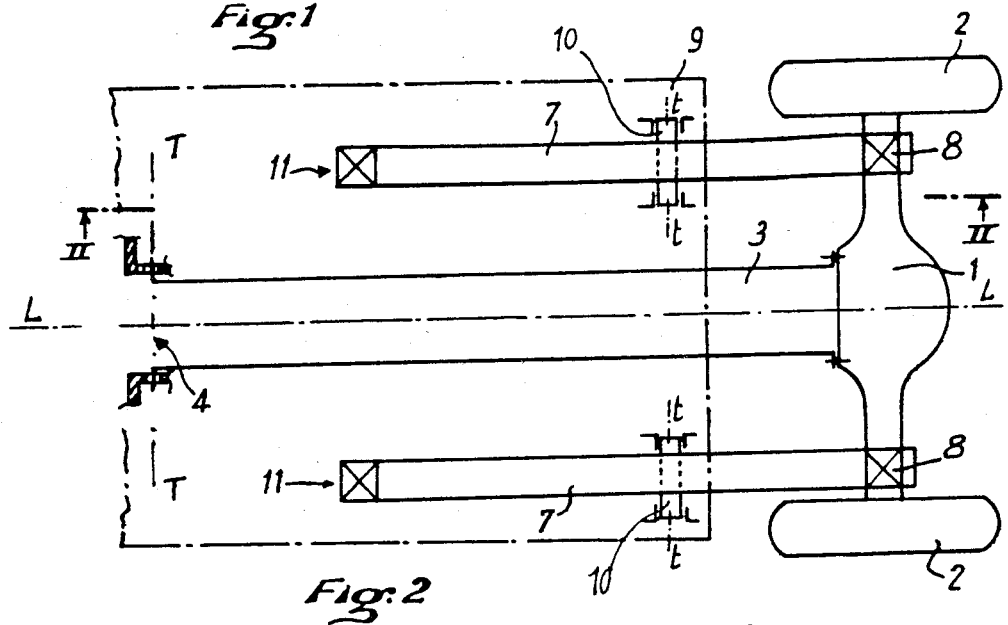
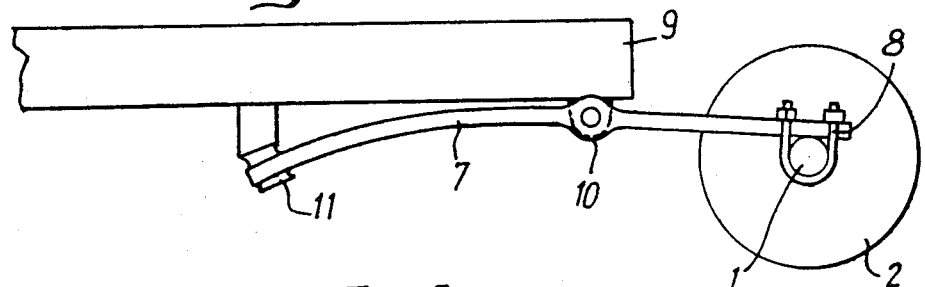
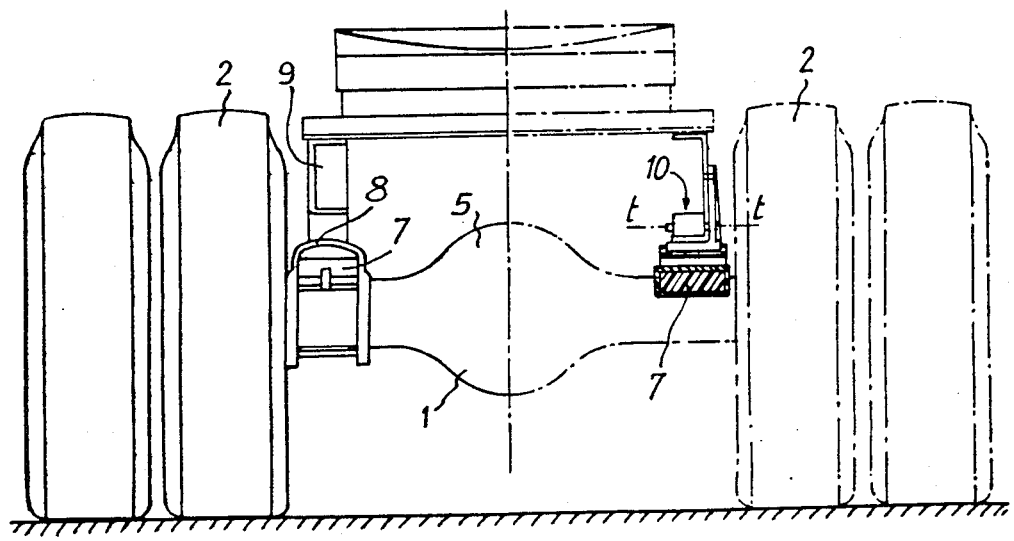

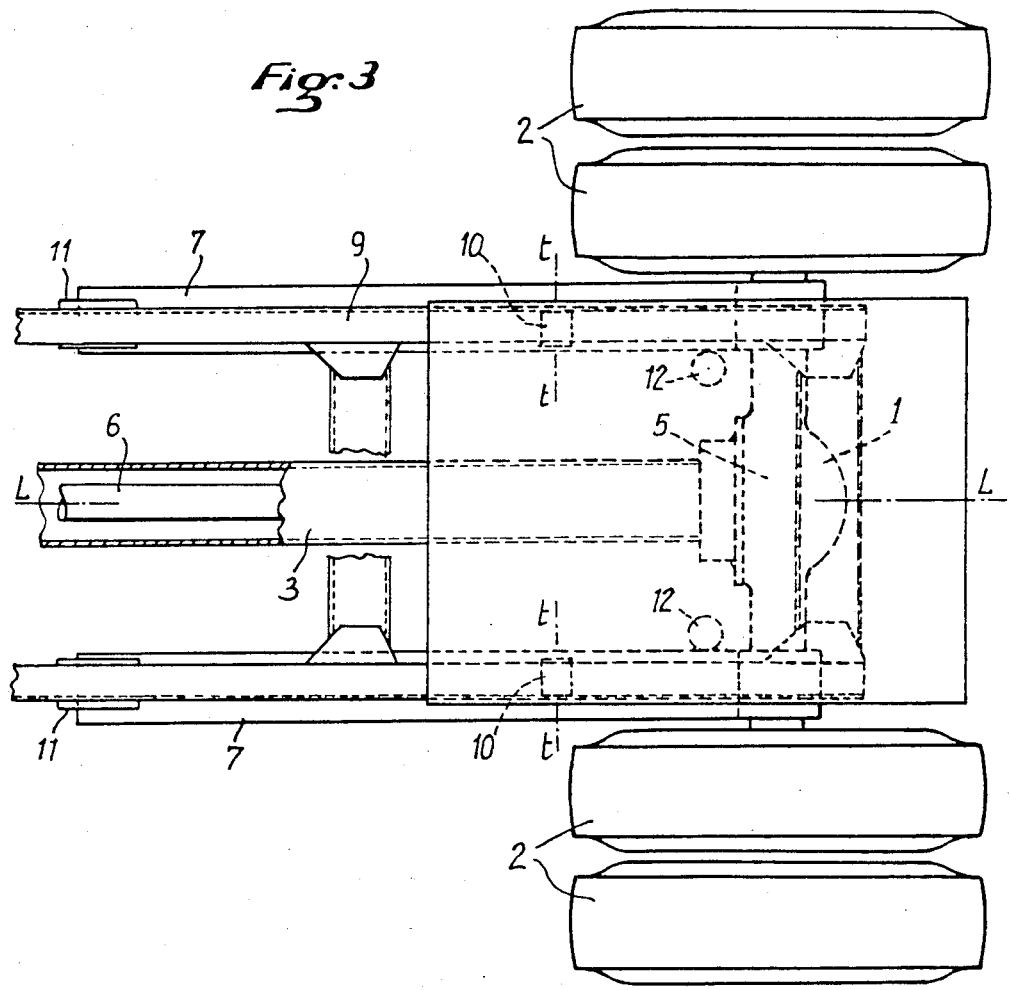
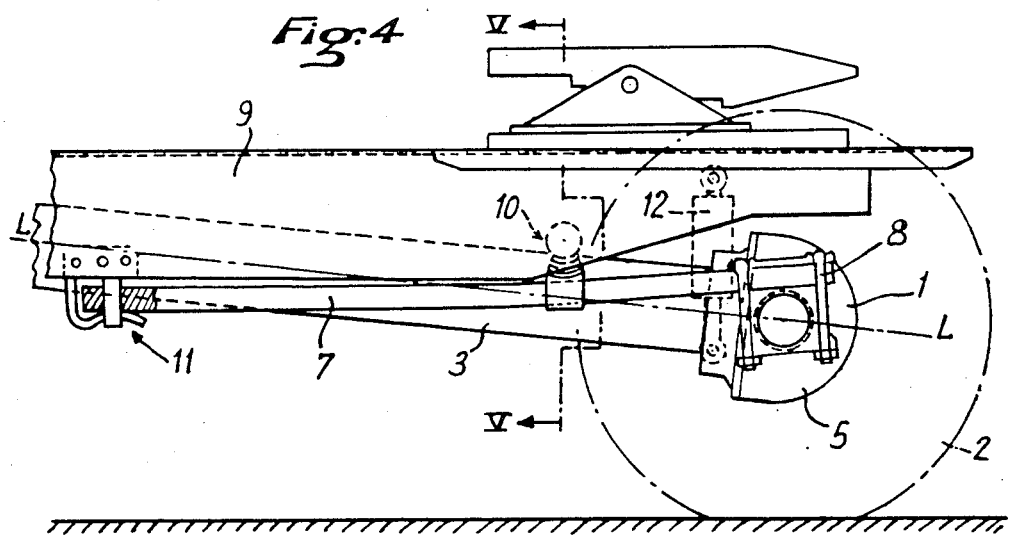

SUSPENSION SYSTEM FOR A SET OF VEHICLE WHEELS WITH RIGID AXLE

The present invention relates to a suspension system for a set of vehicle wheels with rigid axle. It is particularly, although not exclusively, suitable for producing the rear suspension of a road tractor of the type used in semitrailer trucks.

To this end, according to the invention, the suspension system for a set of vehicle wheels with rigid axle, is noteworthy in that it comprises, on the one hand, a longitudinal torsion tube articulated at one of its ends on the chassis of the vehicle so as to be able to pivot about a transverse horizontal axis without possibility of rotating about its longitudinal axis and fast at its other end with said rigid axle and, on the other hand, two longitudinal elastic blades which are disposed laterally each on one side of said torsion tube and of which each is fixed at one of its ends to said axle, is pivoted in its intermediate part on said chassis about a transverse axis and is in abutment at its other end against said chassis.

Said torsion tube thus performs the function of anti-camber when it is stressed in torsion, as well as the function of transmission of the longitudinal efforts (traction and braking) when it is stressed in traction. Furthermore, the two elastic blades ensure the vertical suspension and lateral guiding of the wheels of said set of wheels.

Said torsion tube is advantageously disposed so that its longitudinal axis lies in the median longitudinal plane of the vehicle and said elastic blades are identical and disposed symmetrically with respect to said tube.

If said rigid axle is constituted by the rear axle of the vehicle, the torsion tube presents internal dimensions which are sufficient for it to be able to be traversed longitudinally by the power transmission shaft connecting the gear box to said rear axle.

Said torsion tube and said elastic blades are preferably made of high-resistance fibers coated with synthetic resin. The fact of making said tube and blades of fiber/synthetic resin composite material makes it possible to obtain for these elements mechanical characteristics corresponding to the functions that they fulfill and which it would be impossible to obtain with steel elements, with comparable dimensions and weight. Thanks to the present invention, a suspension may therefore be made which, whilst being simple, is light, thus leading to a saving in overall weight of the vehicle, and therefore a saving in fuel consumption.

The invention will be more readily understood on reading the following description with reference to the accompanying drawings, in which:

FIG. 1 is a schematic plan view of the suspension system according to the invention.

FIG. 2 is a section along line II—II of FIG. 1.

FIG. 3 illustrates, in a partial plan view, a practical embodiment of the suspension system according to the invention, mounted on a road tractor.

FIG. 4 is a side view corresponding to FIG. 3.

FIG. 5 is, in its left-hand part, a partial half-view from the rear of the road tractor of FIGS. 3 and 4, and, in its right-hand part, a half-section along line V—V of FIG. 4.

Referring to the drawings, the suspension system according to the invention is applied to the set of rear wheels of a road tractor, constituted by a rear axle 1 bearing wheels 2 at its ends. This suspension system comprises a longitudinal torsion tube 3 whose axis L—L lies in the median logitudinal plane of the vehicle. At its front end, the tube 3 is fast with a pivot pin 4, enabling it to pivot without possibility of rotating about said longitudinal axis L—L, about an axis T—T of the chassis 9 of the vehicle, this axis T—T being horizontal and transverse to said median longitudinal plane of the vehicle. At its rear end, the torsion tube 3 is fast with the flared tube 5 of the rear axle 1. The power transmission shaft 6 passes longitudinally through the torsion tube 3.

The suspension system according to the invention further comprises two longitudinal elastic blades 7, disposed laterally on either side of the torsion tube 3. These blades 7 are identical and disposed symmetrically with respect to said tube 3.

Each elastic blade 7:

is fixed at its rear end to a lateral end of the rear axle 1, via a fixing device 8;

is articulated in its intermediate part on said chassis 9 about a transverse axis t—t, via a pivot pin 10, the axes t—t of the two pivots 10 being aligned;

and is in abutment by its front end against the chassis 9, via bearing devices 11.

The suspension system is completed by shock absorbers 12.

In the suspension system which has just been described:

the anti-camber (or anti-roll) function is ensured by the tube 3 working in torsion about its longitudinal axis L—L;

the function of transmission of the longitudinal efforts is ensured by the tube 3 working in compression, parallel to its longitudinal axis L—L;

the functions of vertical suspension and of lateral guiding are ensured by the elastic blades 7.

The torsion tube 3 and the blades 7 are preferably constituted by elements made of a composite material constituted by fibers (glass, carbon, boron, etc . . . or a mixture of these matters) coated with a synthetic resin, by any known process (filamentary winding, superposition of braiding, weaving, etc . . . ) making it possible to obtain for said tubes high values of the ratio E/R, in which R is the breaking stress and E the modulus of elasticity.

What is claimed is:

1. A suspension system for a set of vehicle wheels with rigid axle, comprising:

a longitudinal torsion tube made of a composite fiber-synthetic resin material, articulated at one of its ends on the chassis of the vehicle so as to be able to pivot about a transverse horizontal axis without possibility of rotating about its longitudinal axis and fast at its other end with said rigid axle and;

two longitudinal elastic blades made of a composite fiber-synthetic resin material which are disposed laterally each on one side of said torsion tube and of which each is fixed at one of its ends to said axle, is pivoted in its intermediate part on said chassis about a transverse axis and is in abutment at its other end against said chassis.

2. The suspension system claim 1,
wherein said torsion tube is disposed so that its longitudinal axis lies in the median longitudinal plane of the vehicle and said elastic blades are identical and disposed symmetrically with respect to said tube.

3. The suspension system of claim 1, for a set of wheels of which the rigid axle is constituted by a rear axle, wherein said torsion tube presents internal dimensions sufficient to be able to be traversed longitudinally by the power transmission shaft.

4. A suspension system for a vehicle chassis having a rigid axle and wheels mounted to said axle, comprising:
  a torsion tube having a longitudinal axis and opposite ends, said tube being made of a composite fiber-synthetic resin material;
  said chassis having first pivot means for mounting one of said ends of said torsion tube to said chassis for pivotal movement about an axis transverse to said longitudinal axis, and for preventing rotational movement about said longitudinal axis;
  means for fixedly mounting said torsion tube to said axle;
  two longitudinal elastic blades having opposite ends made of a fiber-synthetic resin material, each of said blades being positioned on one side of said torsion tube, each of said blades being fixed at one of said ends to said axle;
  said chassis having second and third mounting means for respectively pivotally mounting each of said blades to said chassis intermediate said ends, and said chassis having first and second simple support means for respectively supporting each of the other of said ends of said blades to said chassis in simple support.

* * * * *